(12) United States Patent
Trimble et al.

(10) Patent No.: US 8,616,637 B2
(45) Date of Patent: Dec. 31, 2013

(54) SEAT SUPPORT ASSEMBLY

(75) Inventors: Robert W. Trimble, Gainesville, TX (US); Rakibul Islam, Lewisville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 294 days.

(21) Appl. No.: 13/099,813

(22) Filed: May 3, 2011

(65) Prior Publication Data

US 2011/0278887 A1 Nov. 17, 2011

Related U.S. Application Data

(60) Provisional application No. 61/330,514, filed on May 3, 2010.

(51) Int. Cl.
*B60N 2/42* (2006.01)
(52) U.S. Cl.
USPC ............. 297/216.2; 297/216.15; 297/216.19
(58) Field of Classification Search
USPC ................. 297/216.16, 216.19, 216.2, 463.1, 297/463.2
See application file for complete search history.

(56) References Cited

U.S. PATENT DOCUMENTS

| | | | | |
|---|---|---|---|---|
| 2,401,748 | A | * | 6/1946 | Dillon ........................ 244/122 B |
| 2,933,127 | A | | 4/1960 | Brewster |
| 2,959,207 | A | | 11/1960 | Brewster |
| 3,059,966 | A | | 10/1962 | Spielman |
| 3,603,638 | A | | 9/1971 | McGregor |
| 4,440,441 | A | | 4/1984 | Marrujo et al. |
| 4,523,730 | A | | 6/1985 | Martin |
| 4,718,719 | A | | 1/1988 | Brennan |
| 4,796,837 | A | | 1/1989 | Dowd |

(Continued)

FOREIGN PATENT DOCUMENTS

| | | |
|---|---|---|
| JP | H0373737 U | 7/1991 |
| JP | 2001289274 | 10/2001 |

(Continued)

OTHER PUBLICATIONS

International Preliminary Report on Patentability dated Nov. 15, 2012 in related Application No. PCT/US2011/034949.
Partial International Search Report dated Sep. 30, 2011 in related Application No. PCT/US2011/034949.
International Search Report and Written Opinion dated May 30, 2012 in related Application No. PCT/US2011/034949.

*Primary Examiner* — Philip Gabler
(74) *Attorney, Agent, or Firm* — Dean W. Russell; Tiffany L. Williams; Kilpatrick Townsend & Stockton LLP

(57) ABSTRACT

Described are seat support assemblies comprising at least one of a pitch reducer assembly, a fitting assembly, an energy absorption assembly, and an integrated leg assembly. The pitch reducer assembly may include a pitch reducer housing, at least one pitch riser, and at least one pitch stop. The integrated leg assembly may include a forward leg and an aft leg, where the forward leg is coupled to the pitch reducer assembly. The fitting assembly may include a pair of forward housing mating components and a pair of aft housing mating components, where the pairs of mating components are coupled to the forward and aft legs, respectively. The energy absorption assembly may include a tubular member, a die slidingly coupled to the tubular member, and a die holder coupled to the die, wherein the die holder has a hemispherical outer surface that is configured to pivotally mate with a passenger seat housing and rotate about an arc of rotation relative to the tubular member.

22 Claims, 15 Drawing Sheets

(56) References Cited

U.S. PATENT DOCUMENTS

| | | | |
|---|---|---|---|
| 4,861,103 A | 8/1989 | Vallee | |
| 4,911,381 A | 3/1990 | Cannon et al. | |
| 5,058,829 A | 10/1991 | Bentley | |
| 5,069,505 A | 12/1991 | Amthor et al. | |
| 5,152,578 A | 10/1992 | Kiguchi | |
| 5,227,979 A | 7/1993 | Bales et al. | |
| 5,657,950 A * | 8/1997 | Han et al. | 244/122 R |
| 5,730,492 A * | 3/1998 | Warrick et al. | 297/216.2 |
| 6,565,151 B2 * | 5/2003 | Jarnail et al. | 297/216.16 |
| 2005/0109877 A1 * | 5/2005 | Williamson et al. | 244/118.1 |

FOREIGN PATENT DOCUMENTS

| | | |
|---|---|---|
| JP | 2002227898 | 8/2002 |
| WO | 9009905 A1 | 9/1990 |
| WO | WO2010041235 | 4/2010 |
| WO | 2011140055 | 11/2011 |

* cited by examiner

SEAT SUPPORT ASSEMBLY

CROSS REFERENCE TO RELATED APPLICATION

This application is related to and claims priority benefits from U.S. Provisional Application Ser. No. 61/330,514, filed on May 3, 2010, entitled TRANSPORT VEHICLE PASSENGER SEAT. The '514 application is hereby incorporated herein in its entirety by this reference.

FIELD OF THE INVENTION

The invention relates to seat support assemblies of passenger seats or the like.

BACKGROUND

Passenger aircraft, buses, trains, and the like include passenger seats that must be both safe and cost-effective. In order to improve the cost effectiveness of such passenger seats, the materials used to manufacture these seats have become increasingly lighter in recent years. In particular, the use of lightweight materials in passenger seats is playing an increased role to continue the reduction in seat weight. While reducing the weight of passenger seats is an economic benefit, these passenger seats must still be capable of meeting the necessary safety and performance standards associated with passenger seats for use in passenger vehicles.

With respect to aircraft passenger seats, these seats are required to withstand forces that may be applied during a minor crash landing. During these types of events, the vehicle floor may become distorted. This distortion may cause the seat tracks to move out of plane, which creates high stresses on traditional passenger seat frames due to torsion instability of the seat.

To determine whether a passenger seat can withstand these types of forces, the seat must pass a series of performance tests, commonly referred to as "16g tests." One criteria to determine whether an aircraft passenger seat has passed the 16g test is whether the seat remains attached to the airframe after the specified force has been applied. Moreover, new rigid seat designs must pass a pitch operation and a roll operation that occur prior to the 16g structural test.

Traditionally, passenger seat design have either been rigid in nature or have focused on incorporating energy absorbing features, such as energy absorption devices or plastic deformation, to relieve floor loads during the dynamic test event. These types of devices are not necessarily configured to also address the additional pre-test conditions.

With the advent of composite materials for construction of passenger seats, the ability to incorporate the necessary energy absorbing features into the passenger seats has become more challenging because these materials commonly have very small differences between tensile, yield, and rapture.

Accordingly, it may be desirable to provide a seat structure that provides the necessary energy absorption features for use with lighter weight materials. It may also be desirable to provide a seat structure that reduces stress due to floor distortion prior to application of a dynamic test.

SUMMARY

Embodiments of the invention may comprise a seat support assembly comprising a pitch reducer assembly comprising a pitch reducer housing, at least one pitch riser, and at least one pitch stop. In some embodiments, the at least one pitch riser comprises a plurality of rings coupled to a riser shaft. In other embodiments, the at least one pitch stop comprises a stop shaft comprising a lower stop. The pitch reducer assembly may be activated by deploying the riser shaft from a retracted position within the at least one pitch riser, and deploying a stop shaft from a retracted position within the at least one pitch stop. The method may further comprise rotating the at least one pitch riser and the at least one pitch stop relative to a pitch reducer housing.

In some embodiments, the seat support assembly comprises a fitting assembly comprising a pair of forward housing mating components comprising at least one rotational coupling device, and a pair of aft housing mating components comprising at least one rotational coupling device. The fitting assembly may be activated by rotating and/or separating at least one of the forward housing mating components or aft housing mating components so that the paired mating components are not vertically aligned with each other.

In some embodiments, the seat support assembly may comprise an energy absorption assembly comprising a tubular member, a die slidingly coupled to the tubular member, and a die holder coupled to the die, wherein the die holder has a hemispherical outer surface that is configured to pivotally mate with a passenger seat housing and rotate about an arc of rotation relative to the tubular member.

In some embodiments, the seat support assembly may further comprise an integrated leg assembly comprising a forward leg and an aft leg. In these embodiments, the forward leg is rotationally coupled to the pair of forward housing mating components and the aft leg is rotationally coupled to the pair of aft housing mating components. The forward leg may be coupled to the aft leg via a base tube, and the aft leg may further comprise a leg extension. The leg extension may also be pivotally coupled to the ball joint of the rod.

DETAILED DESCRIPTION

Figure 1:
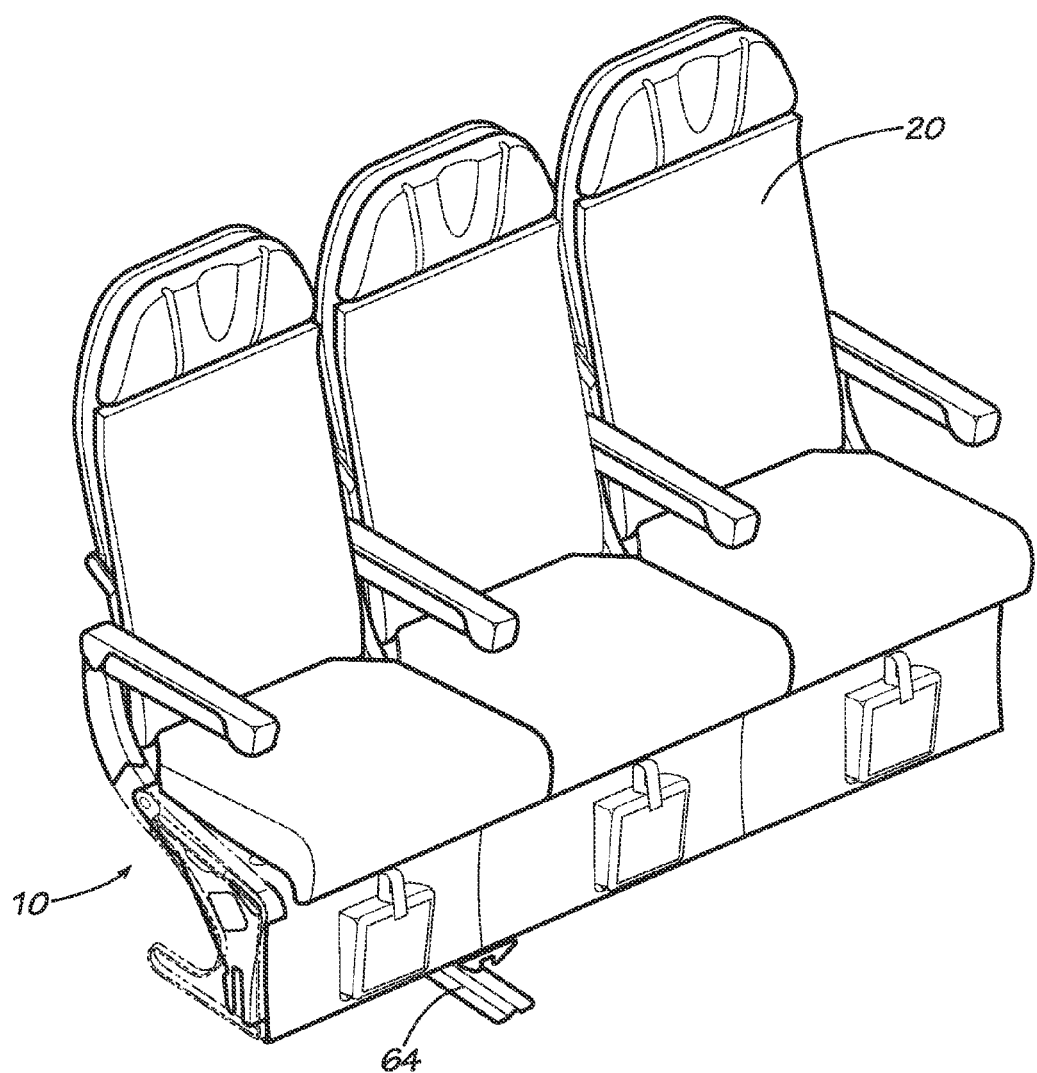
FIG. 1 is a perspective view of a row of passenger seats with the seat support assemblies according to one embodiment of the present invention.

The described embodiments of the invention provide seat support assemblies for use with a passenger seat. While the seat support assemblies are discussed for use with aircraft passenger seats, they are by no means so limited. Rather, embodiments of the seat support assemblies may be used for other seats of any type or otherwise as desired.

FIGS. 1-18 illustrate embodiments of a seat support assembly 10. In these embodiments, the seat support assembly 10 comprises a pitch reducer assembly 12, an integrated leg assembly 14, a fitting assembly 16, and an energy absorption assembly 18.

In some embodiments, the pitch reducer assembly 12 is configured to reduce the internal stress in a passenger seat 20 due to pitch operation prior to a 16g structural test. In these embodiments, the pitch reducer assembly 12 comprises at least one pitch riser 22 and at least one pitch stop 24. In the embodiment shown in FIGS. 2-3 and 11, two pitch stops 24 are used in combination with three pitch risers 22. However, one of ordinary skill in the relevant art will understand that any suitable number of pitch risers 22 and pitch stops 24 may be used in any combination or location within the pitch reducer assembly 12.

In one embodiment, the pitch riser 22 and the pitch stop 24 each comprise a bottom stop 26. In the pitch riser 22, the bottom stop 26 is positioned adjacent a riser shaft 28. The riser shaft 28 may have any suitable cross-sectional shape, including but not limited to circular, oval, parabolic, rectilinear, hexagonal, octagonal, or other similar polygonal shape. The riser shaft 28 may be formed of materials including but not limited to aluminum, stainless steel, other metallic materials, composite materials, or other similar materials.

The length of the riser shaft 28 may be surrounded by a plurality of rings 30. Each ring 30 may include an ring aperture 32, where the ring aperture 32 is shaped to substantially correspond to the cross-sectional shape of the riser shaft 28. In the embodiment shown in FIG. 5, the ring aperture 32 and the riser shaft 28 have a circular cross-sectional shape. However, one of ordinary skill in the relevant art will understand that any suitable cross-sectional shape may be used.

In some embodiments, each ring 30 includes a slit 34 so that the ring 30 is a partial ring. In this embodiment, the slit 34 allows the size of the ring aperture 32 to expand when the riser shaft 28 is inserted. The ring 30 may be formed of a material that allows the ring 30 to return to its original shape when the riser shaft 28 is removed. Such materials include but are not limited to plastics, rubber, aluminum, stainless steel, other metallic materials, composite materials, or other similar materials. As a result, each ring 30 is slightly expanded from its original shape when the riser shaft 28 is inserted through the ring aperture 32.

In other embodiments, the rings 30 do not include the slit 34. As a result, in this embodiment, the rings 30 are formed of a compressible material having some elasticity to return to its original shape after the compressive force has been removed. Such materials may include but are not limited to deformable plastics, foam rubber, or other similar compressible materials. In this embodiment, the ring apertures 32 are sized to have a slightly smaller cross-sectional area than the cross-sectional shape of the riser shaft 28, but are configured to expand when the riser shaft 28 is inserted, which in turn compresses the ring 30. In order to expand the ring apertures 32, an external force is applied to expand each ring aperture 32 so that the riser shaft 28 can be inserted.

Figure 5:
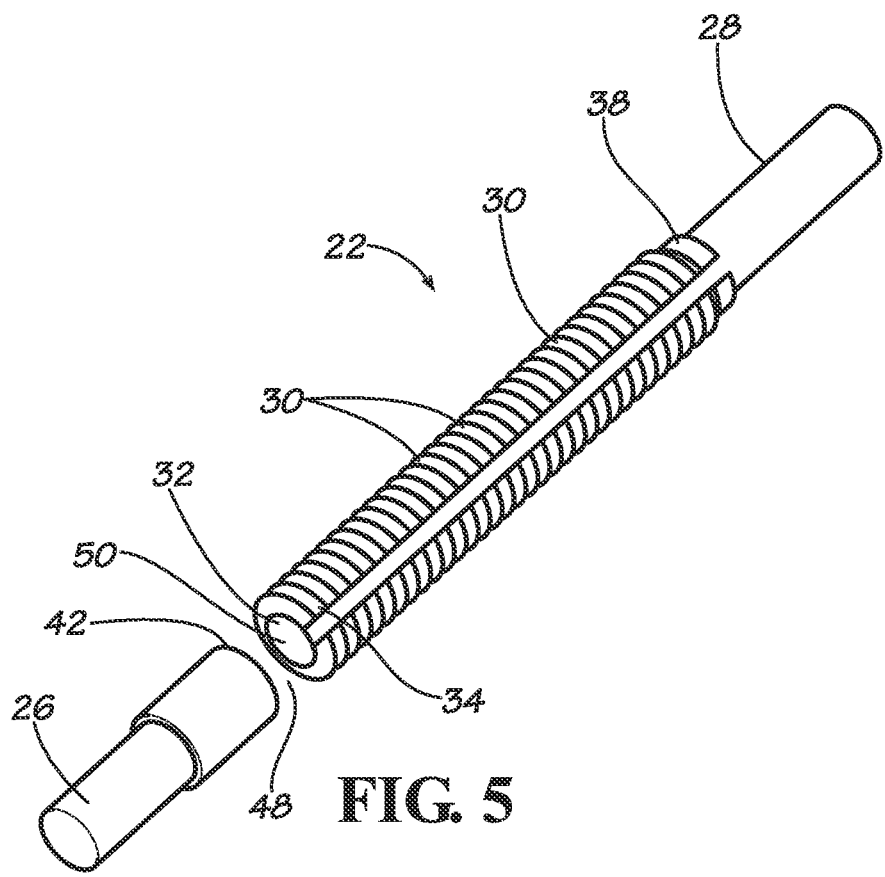
FIG. 5 is a perspective view of the pitch riser of FIG. 4 with the housing removed.

In the embodiment shown in FIG. 5, the riser shaft 28 includes an upper stop 38. The upper stop 38 is configured to have a cross-sectional shape that is larger than the shaft cross-sectional shape, but smaller than the cross-sectional shape of each ring 30 when the rings 30 are positioned on the riser shaft 28. The upper stop 38 may also include at least one indentation, which may, but not necessarily, be aligned with the slits 34 in the rings 30.

In some embodiments, a housing 40 is coupled to the pitch riser 22, where the housing 40 surrounds at least a portion of the riser shaft 28, the rings 30, the upper stop 38, and the bottom stop 26. The housing 40 may be formed of materials including but not limited to aluminum, stainless steel, other metallic materials, composite materials, or other similar materials. In these embodiments, the housing 40 is shaped to couple to an upper end 42 of the bottom stop 26.

The interior of the housing 40 has a cross-sectional shape that allows the combined cross-sectional shape of the riser shaft 28 and the rings 30, as well as the combined cross-sectional shape of the riser shaft 28 and the upper stop 38, to travel along its length. In contrast, the opening 46 of the housing 40 has a cross-sectional shape that allows the combined cross-sectional shape of the stop shaft 52 and the upper stop 38 to pass through the opening 46, while preventing the combined cross-sectional shape of the riser shaft 28 and the rings 30, as well as the rings 30 themselves, from passing through the opening 46. As a result, as the riser shaft 28 separates from the rings 30 as it passes through the opening 46, and the rings 30 are trapped within the housing 40. In some embodiments, the opening 46 may include at least one projection and the upper stop 38 may include at least one indentation, where the projection and the indentation are aligned so that the upper stop 38 may pass through the opening 46.

The housing 40 has a length that forms a void space 48 between the upper end 42 of the bottom stop 26 and a lower end 50 of the riser shaft 28 when the riser shaft 28 is positioned within the housing 40 so that the upper stop 38 is aligned approximately adjacent the opening 46 (the riser retracted position). When the riser shaft 28 is pulled out of the housing 40, an edge of the opening 46 begins to apply pressure to the ring 30 closest to the opening 46, which in turn applies pressure to the next adjacent ring 30 and so on until the lowest rings 30 begin sliding off the lower end 50 of the riser shaft 28 into the void space 48. The rings 30 then begin to accumulate in the void space 48, where the size of the void space 48 increases as the riser shaft 28 exits the opening 46 until the riser shaft 28 has been removed from a majority of the rings 30 (the riser deployed position). Once the riser shaft 28 is removed from each ring 30, the ring 30 returns to its original size and shape. As a result, the riser shaft 28 cannot be reinserted to its original position because the ring aperture 32 is no longer in its expanded shape to allow the riser shaft 28 to pass through it.

Figure 6:
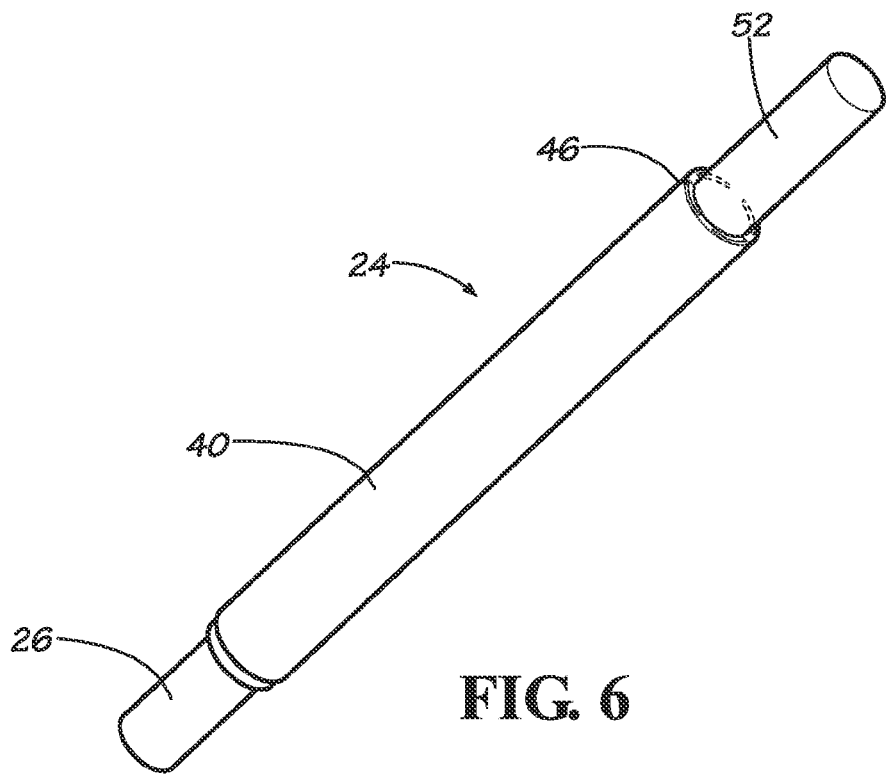
FIG. 6 is a perspective view of a pitch stop of the pitch reducer assembly of FIG. 3.
Figure 7:
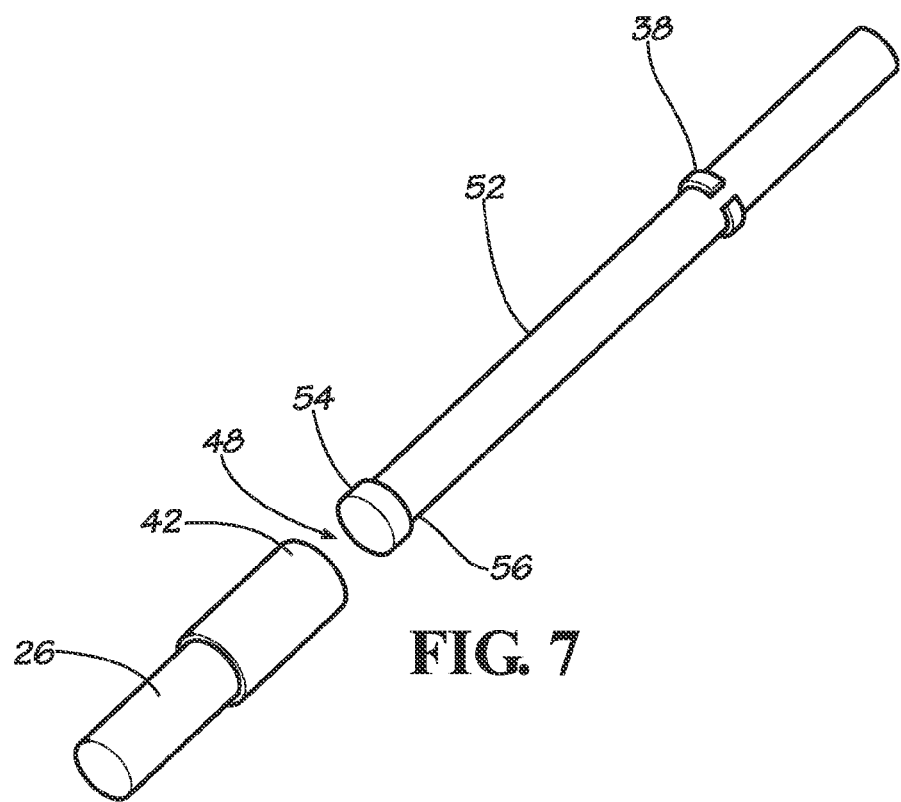
FIG. 7 is a perspective view of the pitch stop of FIG. 6 with the housing removed.
Figure 8:
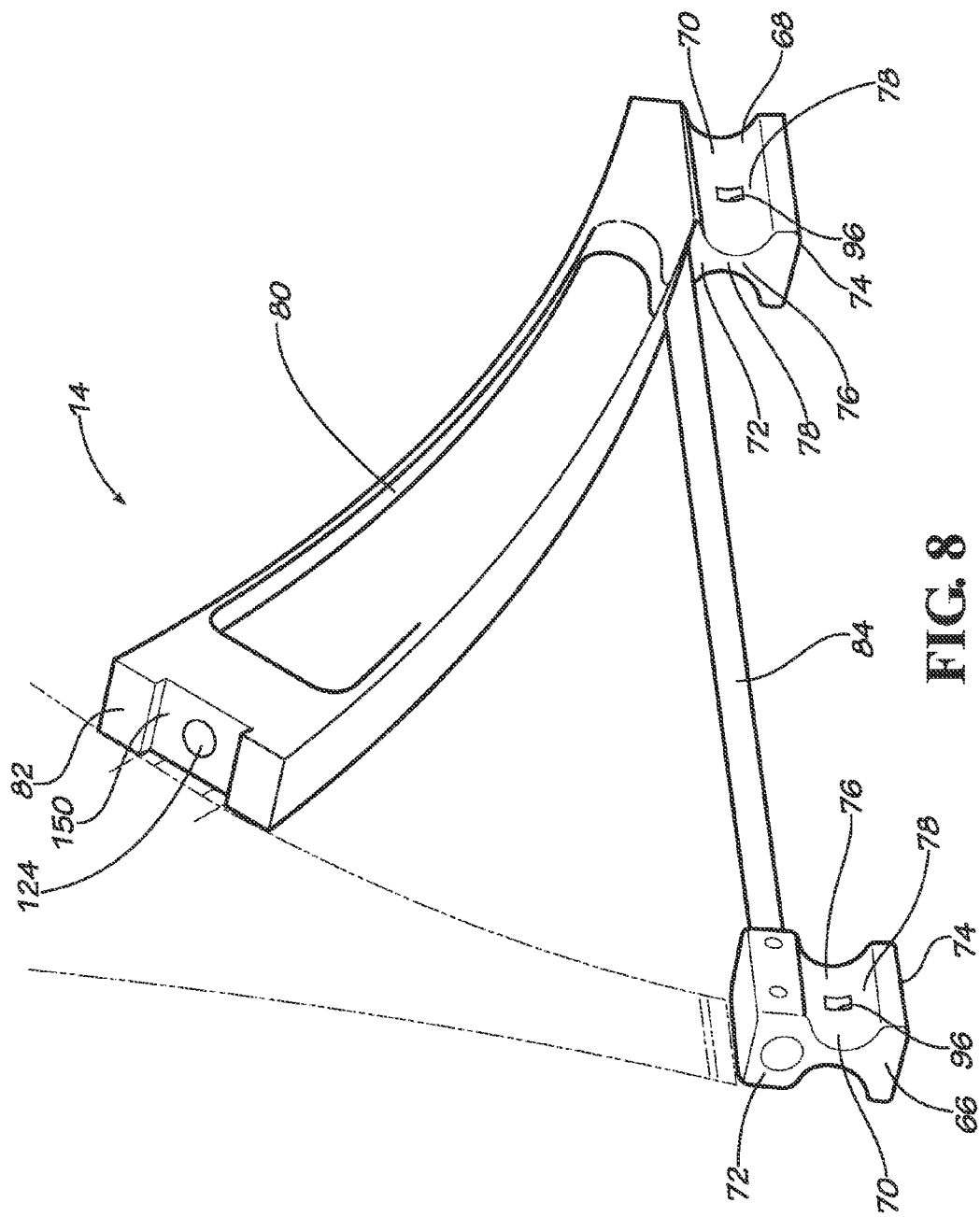
FIG. 8 is a perspective view of an integrated leg assembly of the seat support assembly of FIG. 2.

In the pitch stop 24, as shown in FIGS. 6-7, the bottom stop 26 is also positioned adjacent a stop shaft 52. Like the riser shaft 28, the stop shaft 52 may have any suitable cross-sectional shape, including but not limited to circular, oval, parabolic, rectilinear, hexagonal, octagonal, or other similar polygonal shape. The stop shaft 52 may be formed of materials including but not limited to aluminum, stainless steel, other metallic materials, composite materials, or other similar materials. A lower stop 54 may added to surround a lower end 56 of the stop shaft 52.

In some embodiments, the stop shaft 52 has a cross-sectional shape and length that corresponds to the cross-sectional shape and length of the riser shaft 28. In these embodiments, the stop shaft 52 may also include the upper stop 38. In other embodiments, the lower stop 54 may be integrally formed with the stop shaft 52. However, one of ordinary skill in the relevant art will understand that any suitable shape and length may be used for the stop shaft 52.

In some embodiments, the pitch stop 24 also includes the housing 40, where the housing 40 surrounds at least a portion of the stop shaft 52, the upper stop 38, the lower stop 54, and the bottom stop 26. In these embodiments, the housing 40 is shaped to couple to the upper end 42 of the bottom stop 26.

As described above with respect to the pitch riser 22, the interior of the housing 40 has a cross-sectional shape that allows the combined cross-sectional shape of the stop shaft 52 and the lower stop 54 to travel along its length, as well as the combined cross-sectional shape of the stop shaft 52 and the upper stop 38, to travel along its length. In contrast, the opening 46 of the housing 40 has a cross-sectional shape that allows the combined cross-sectional shape of the stop shaft 52 and the upper stop 38 to pass through the opening 46, while preventing the combined cross-sectional shape of the stop shaft 52 and the lower stop 54 from passing through the opening 46. As a result, the lower stop 54, as well as the portion of the stop shaft 52 adjacent the lower stop 54, are trapped within the housing 40. As discussed above with respect to the pitch riser 22, the opening 46 may include at least one projection and the upper stop 38 may include at least one indentation, where the projection and the indentation are aligned so that the upper stop 38 may pass through the opening 46.

Similar to the pitch riser 22, the housing 40 has a length that forms the void space 48 between the upper end 42 of the bottom stop 26 and the lower stop 54 of the stop shaft 52 when the stop shaft 52 is positioned within the housing 40 so that the upper stop 38 is aligned approximately adjacent the opening 46 (the stop retracted position).

In the embodiments where the pitch reducer assembly 12 includes at least one pitch riser 22 and at least one pitch stop 24, the lower stop 54 of the pitch stop 24 also prevents the riser shaft 28 from fully exiting the housing 40 because the shafts 28 and 52 have the same length in these embodiments. In other words, the lower stop 54 contacts the edge of the opening 46 before the full length of the riser shaft 28 is able to exit the housing 40.

Figure 2:
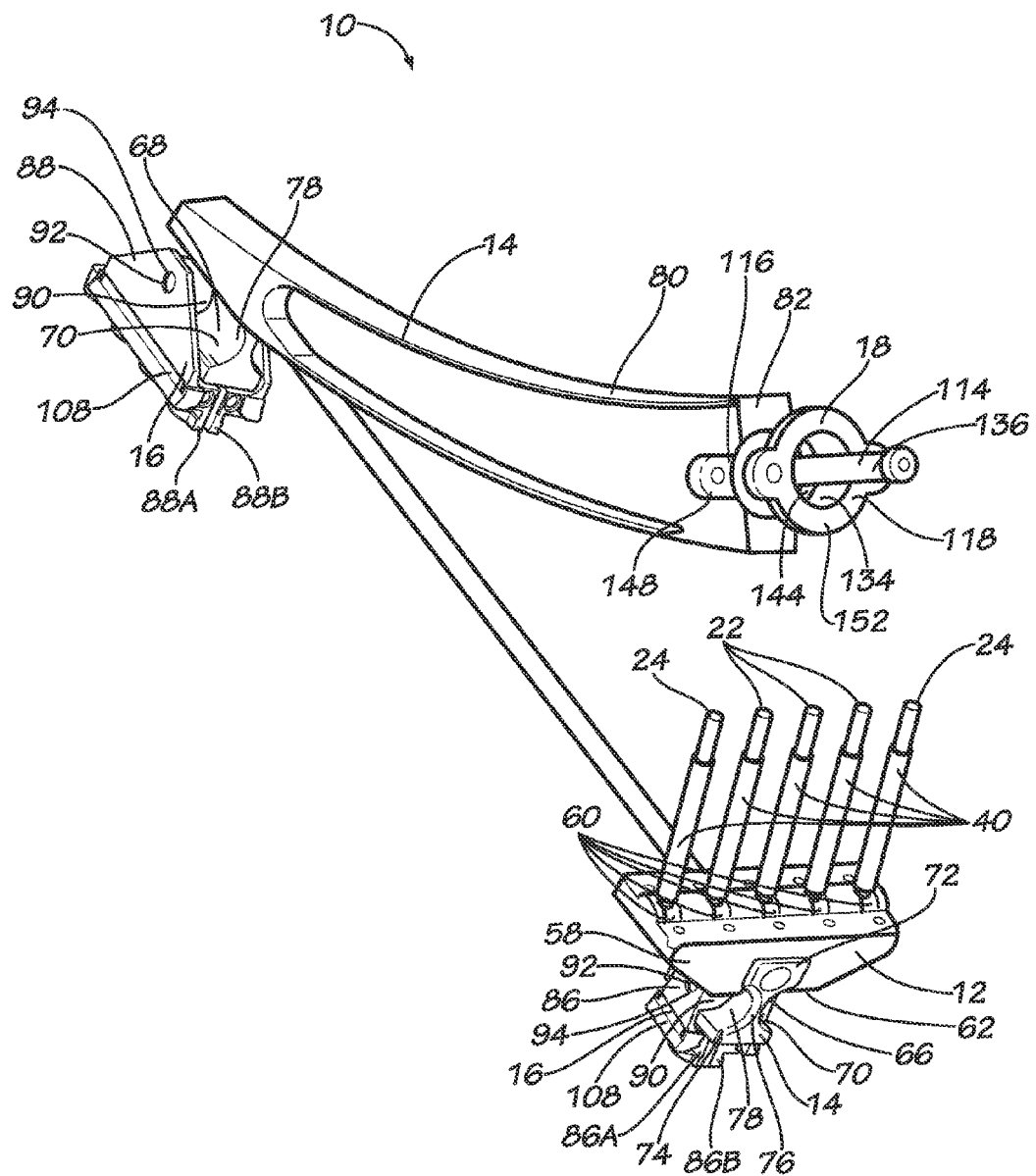
FIG. 2 is a perspective view of the seat support assembly of FIG. 1.
Figure 3:
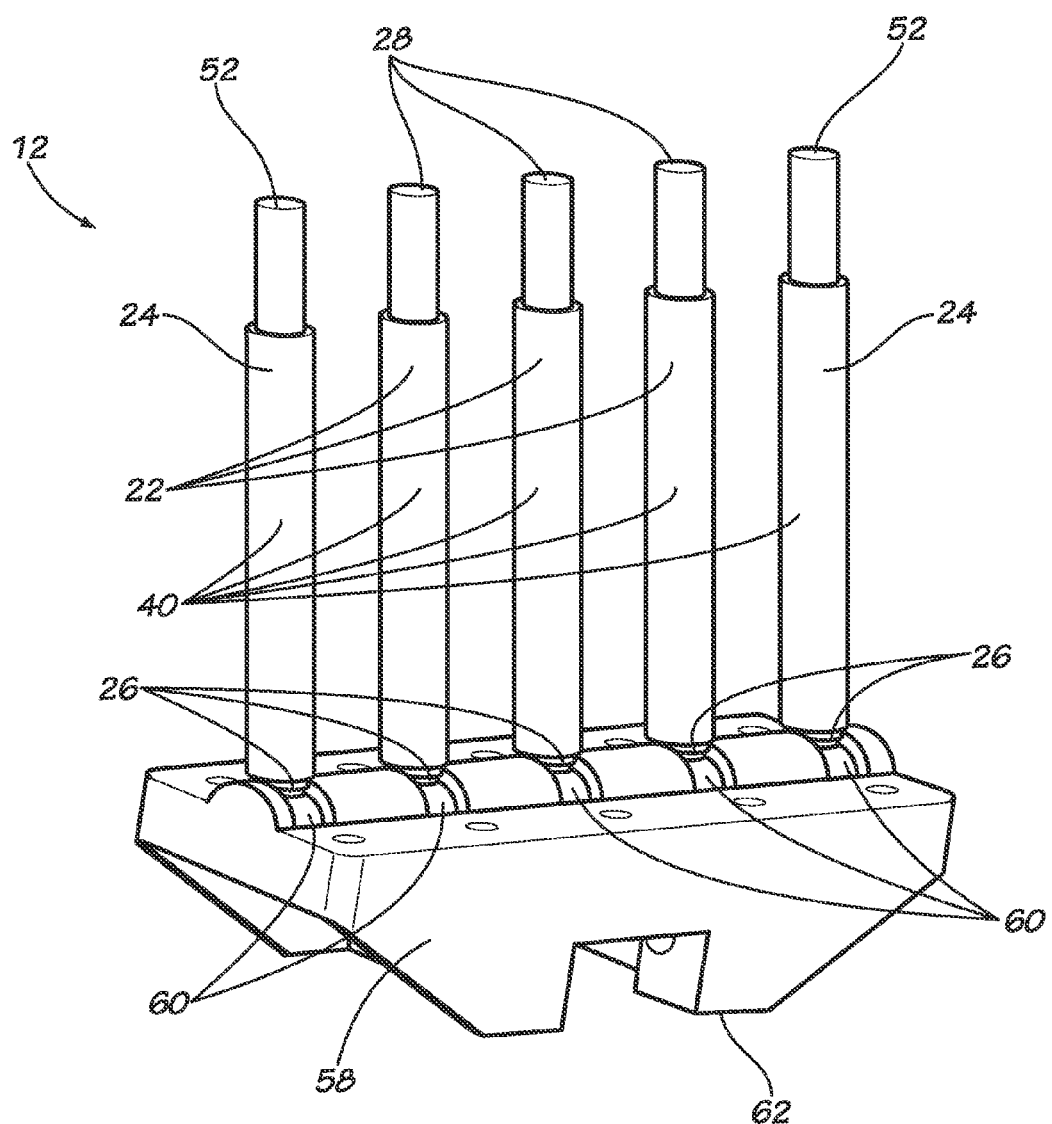
FIG. 3 is a perspective view of a pitch reducer assembly of the seat support assembly of FIG. 2.
Figure 4:
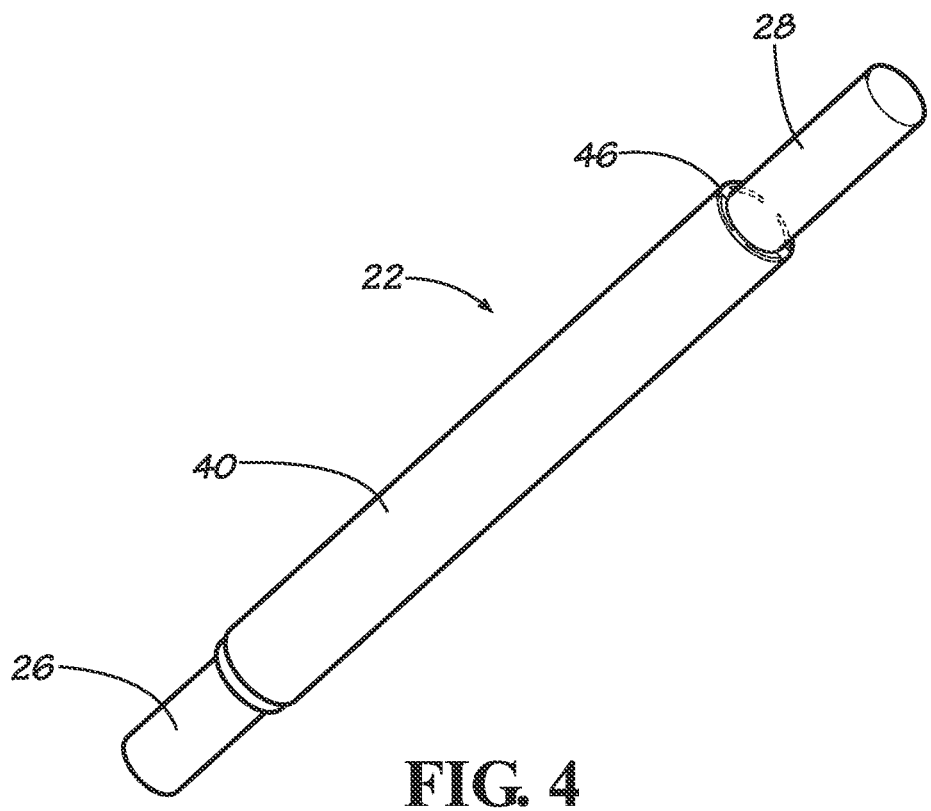
FIG. 4 is a perspective view of a pitch riser of the pitch reducer assembly of FIG. 3.
Figure 12:
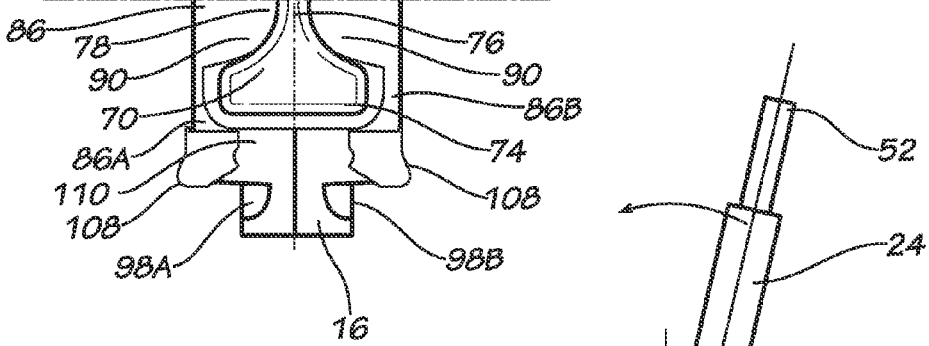
FIG. 12 is a partial side view of the seat support assembly of FIG. 2.
Figure 12:
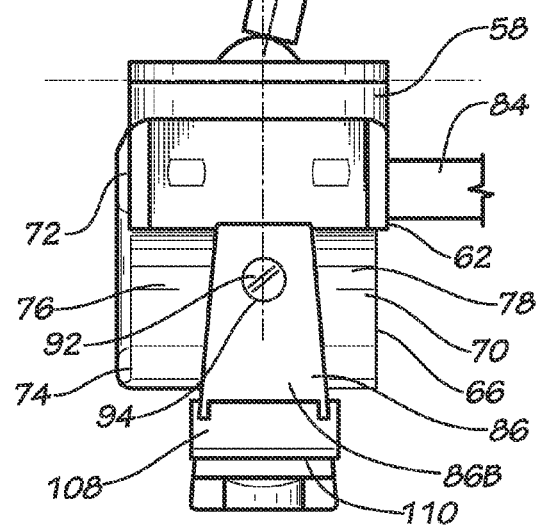
Figure 13:
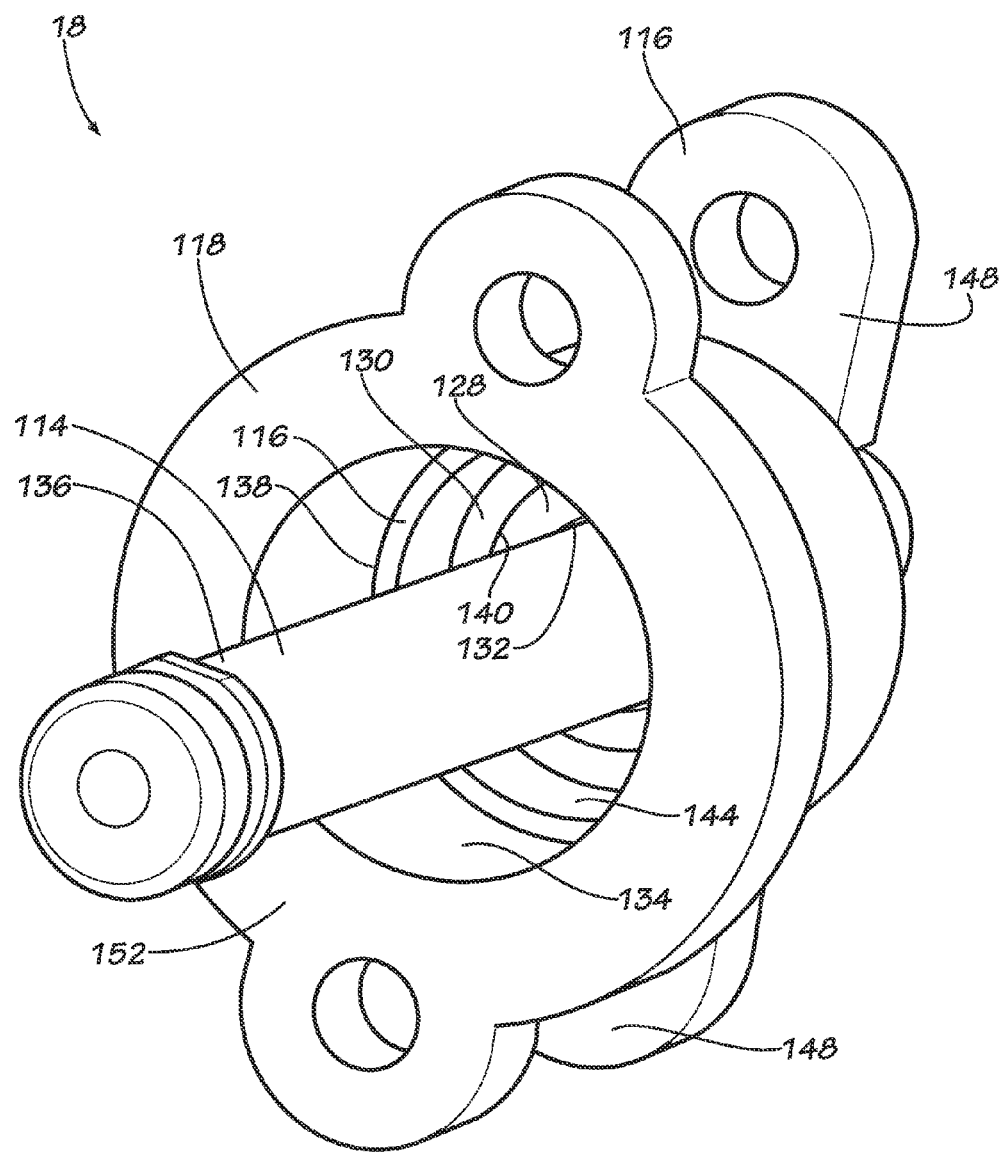
FIG. 13 is a perspective view of an energy absorption assembly of the seat support assembly of FIG. 2.

As shown in FIGS. 2, 3, and 12, the bottom stop 26 of each pitch riser 22 and pitch stop 24 is pivotally coupled to a pitch reducer housing 58. The pitch reducer housing 58 may be formed of materials including but not limited to aluminum, stainless steel, other metallic materials, composite materials, or other similar materials. The pitch reducer housing 58 is configured to include a slot 60 that receives the bottom stop 26. Each slot 60 is shaped to allow the bottom stop 26 to pivot forward and aft relative to the pitch reducer housing 58. The range of pivot accommodates for up to 180 degrees of forward and aft movement of the passenger seat 20. In some embodiments, the pitch riser 22 and the pitch stop 24 may be enclosed by a cover 36.

In some embodiments, a lower end 62 of the pitch reducer housing 58 is coupled to the integrated leg assembly 14 via any suitable mechanical fastener. However, one of ordinary skill in the relevant art will understand that the pitch reducer assembly 12 may be used alone or in conjunction some or all of the other features of the seat support assembly 10.

In these embodiments, the integrated leg assembly 14 is configured to couple the passenger seat 20 to the fitting assembly 16. In the embodiment best shown in FIGS. 2 and 8, the integrated leg assembly 14 comprises a forward leg 66 and an aft leg 68. The forward leg 66 and the aft leg 68 may be formed of materials including but not limited to aluminum, stainless steel, other metallic materials, composite materials, or other similar materials.

In some embodiments, the forward leg 66 and the aft leg 68 comprise a base 70. The base 70 includes an upper end 72 and a lower end 74. The two ends 72 and 74 are separated by a middle region 76. In these embodiments, the middle region 76 includes at least one rotational coupling receptacle 78. The rotational coupling receptacle 78 may have any suitable shape including but not limited to circular, elliptical, or other similar rounded shape that allows the base 70 to have some rotational lateral movement when the middle region 76 is coupled to a suitable mounting device, such as the fitting assembly 16.

In the aft leg 68, the base 70 may be coupled to a leg extension 80. In some embodiments, the leg extension 80 is integrally formed with the base 70. In other embodiments, the leg extension 80 is mechanically or chemically coupled to the base 70 via any suitable fastening means. In these embodiments, the leg extension 80 is shaped to angle upward in a forward direction so that an upper end 82 of the leg extension 80 may be joined to the passenger seat 20. However, one of ordinary skill in the relevant art will understand that the leg extension 80 may have any suitable shape that provides sufficient support for the passenger seat 20.

In some embodiments, the forward leg 66 is coupled to the aft leg 68 via a base tube 84. The base tube 84 is shaped so that the forward leg 66 may rotate laterally relative to the aft leg 68 and vice versa. The base tube 84 is also formed of materials including but not limited to aluminum, stainless steel, other metallic materials, composite materials, or other similar materials. In other embodiments, the forward leg 66 may be uncoupled from the aft leg 68. In yet other embodiments, the forward leg 66 may be rigidly coupled to the aft leg 68 so that the two legs 66 and 68 cannot rotate laterally relative to one another. In yet another embodiment, the forward leg 66 may be integrally formed with the aft leg 68.

In some embodiments, the integrated leg assembly 14 is mounted to the vehicle via the fitting assembly 16. However, one of ordinary skill in the relevant art will understand that the integrated leg assembly 14 may be used alone or in conjunction with some or all of the other features of the seat support assembly 10.

In these embodiments, such as the embodiment best illustrated in FIGS. 2 and 9-12, the fitting assembly 16 is configured to reduce the internal stress in the passenger seat 20 due to the roll operation prior to a 16g structural test and/or crash. The fitting assembly 16 comprises a forward housing 86 and an aft housing 88. The forward housing 86 and the aft housing 88 may be formed of materials including but not limited to aluminum, stainless steel, other metallic materials, composite materials, or other similar materials.

Figure 9:
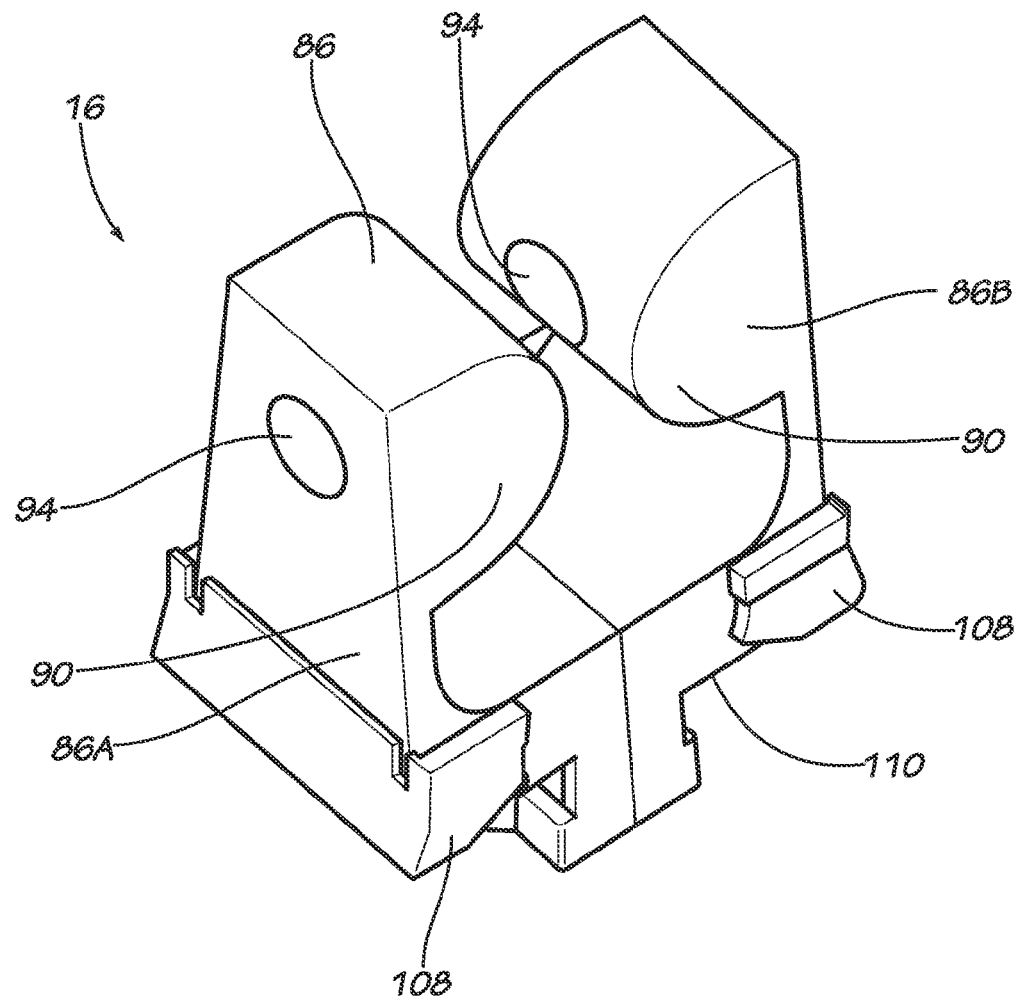
FIG. 9 is a perspective view of a fitting assembly forward housing of the seat support assembly of FIG. 2.
Figure 10:
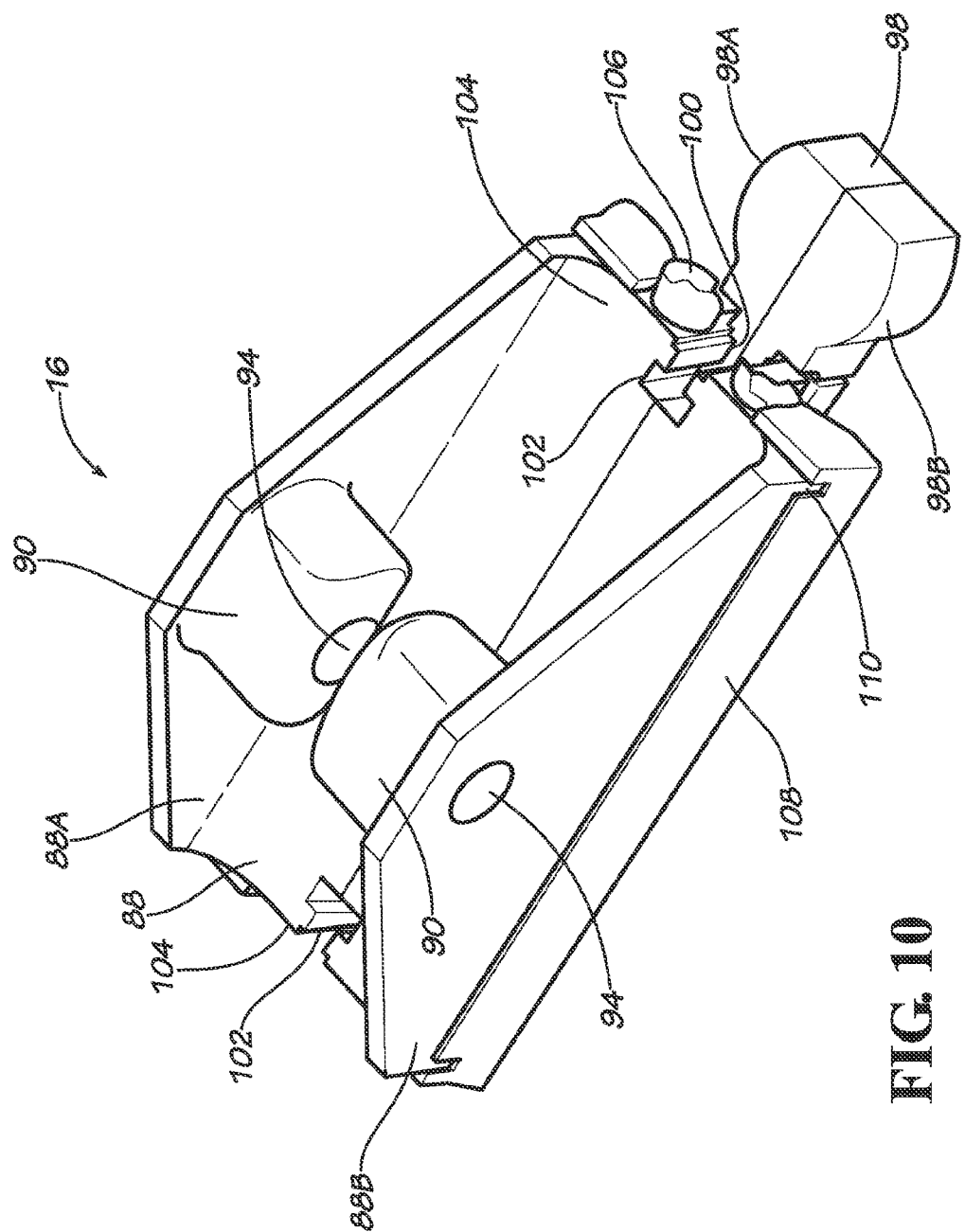
FIG. 10 is a perspective view of a fitting assembly aft housing of the seat support assembly of FIG. 2.
Figure 11:
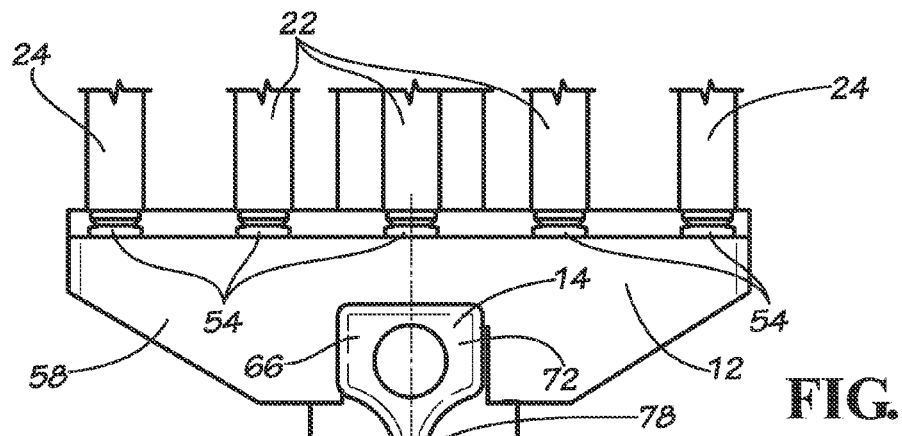
FIG. 11 is a partial front view of the seat support assembly of FIG. 2.

In the embodiment shown in FIG. 9, the forward housing 86 is split into two forward housing mating components 86A and 86B. Likewise, as shown in FIG. 10, the aft housing 88 is split into two aft housing mating components 88A and 88B. The use of split housings 86 and 88 allow for additional roll freedom when the passenger seat 20 is coupled to the fitting assembly 16. However, one of ordinary skill in the relevant art will understand that the use of a split housing to form the forward housing 86 and the aft housing 88 is not necessary, and one or both housings 86 and 88 may be integrally formed.

Each housing 86, 88 includes at least one rotational coupling device 90 that is configured to pivotally mate with the rotational coupling receptacle 78 on the base 70 of the forward leg 66 and the aft leg 68. The rotational coupling device 90 may have any suitable shape that allows the base 70 to laterally pivot around the point where the rotational coupling device 90 contacts the rotational coupling receptacle 78 including but not limited to circular, elliptical, or other similar rounded shape. In the particular embodiment best illustrated in FIGS. 11, 15, and 18, each housing 86, 88 includes two rotational coupling devices 90 that are coupled to two rotational coupling receptacles 78 on each leg 66, 68. However, one of ordinary skill in the relevant art will understand that any suitable combination of rotational coupling devices 90 and rotational coupling receptacles 78 may be used that allow the housings 86, 88 to have some rotational movement relative to the legs 66, 68.

In some embodiments, the rotational coupling device 90 is coupled to the base 70 adjacent the rotational coupling receptacle 78 via a mechanical fastener 92. The mechanical fastener 92 passes through an aperture 94 that is located within the rotational coupling device 90. In these embodiments, the mechanical fastener 92 also passes through a slot 96 on the base 70, where the slot 96 is shaped so that the mechanical fastener 92 does not restrict the rotational movement of the base 70 when the base 70 is coupled to the housings 86, 88. In other embodiments, a pair of apertures 94 may be positioned within the rotational coupling device 90 and a pair of slots 96 may be positioned within the base 70 so that a pair of mechanical fasteners 92 may be used to couple the rotational coupling device 90 to the rotational coupling receptacle 78. In yet other embodiments, the housings 86 and 88 may be formed of a suitable material that does not require the use of a mechanical fastener to maintain an appropriate coupling between the rotational coupling device 90 and the rotational coupling receptacle 78. Suitable materials may include but are not limited to aluminum, stainless steel, other metallic materials, composite materials, or other similar materials.

The aft housing 88 may include at least one shear plunger 98. The shear plunger 98 may be formed of materials including but not limited to aluminum, stainless steel, other metallic materials, composite materials, or other similar materials. The shear plunger 98 may have any suitable shape that allows the fitting assembly 16 to couple with a seat track 64, including but not limited to rectilinear, cylindrical, I-shaped, T-shaped, parabolic, oval, or other similar shapes. In the embodiment shown in FIG. 10, like the housings 86, 88, the shear plunger 98 is split into two shear plunger components 98A and 98B. The use of the split shear plunger 98 allows for additional roll freedom when the passenger seat 20 is coupled to the fitting assembly 16. However, one of ordinary skill in the relevant art will understand that the use of a split plunger to form the shear plunger 98 is not necessary, and the shear plunger 98 may be integrally formed.

Each shear plunger 98 includes a projection 100 that is configured to couple to a receptacle 102 adjacent an end 104 of the aft housing 88. In some embodiments, two shear plungers 98 may be coupled to each end 104 of the aft housing 88. A plunger stop 106 is positioned within each aft housing mating component 88A, 88B and adjacent the receptacle 102. In this position, each plunger stop 106 may be retracted within the body of the aft housing mating component 88A or 88B (the stop retracted position), so that the shear plunger components 98A and 98B may be inserted within the receptacle 102. Each plunger stop 106 may also be extended so that a portion of each plunger stop 106 is positioned above and contacts one of the shear plunger components 98A and 98B (the stop extended position). In the extended position, each plunger stop 106 maintains the shear plunger components 98A and 98B in a deployed position. The plunger stop 106 design allows a technician to activate the shear plunger 98 with one step and without tools.

In some embodiments, an anti-rattle device 108 is coupled to a lower end 110 of each housing 86 and 88. The anti-rattle device 108 is configured to apply resistance between the housings 86, 88 and the seat track 64 so that the housings 86, 88 remain in snug contact with the seat track 64.

In some embodiments, the fitting assembly 16 is used to couple the integrated leg assembly 14 to the vehicle. However, one of ordinary skill in the relevant art will understand that the fitting assembly 16 may be used to couple traditional passenger seat legs to a vehicle or in conjunction with some or all of the other features of the seat support assembly 10.

In some embodiments, the upper end 82 of the leg extension 80 is mounted to the passenger seat 20 via the energy absorption assembly 18. However, one of ordinary skill in the relevant art will understand that the integrated leg assembly 14 may be used alone or in conjunction with some or all of the other features of the seat support assembly 10. In the embodiments shown in FIGS. 2 and 13-17, the energy absorption assembly 18 comprises a tubular member 114, a housing 116, a seat mount 118, a die 128, and a die holder 130.

The tubular member 114 may have a cylindrical cross-sectional shape with a uniform diameter, or it may have a tapered diameter that increases toward an upper end 136 of the tubular member 114. The type of cross-sectional shape may depend on whether the load being applied should remain constant (uniform tubular member diameter) or should be variable to compensate for other changing conditions (tapered tubular member diameter). In the embodiment shown in FIG. 14, the tubular member 114 has a larger diameter above the position of the die 128 and a smaller diameter adjacent the die 128. The upper end 136 has an increased diameter to prevent the tubular member 114 from slipping through the die 128. The materials used to form the tubular member 114 include but are not limited to plastics, composites, or other similar deformable materials.

In some embodiments, the die 128 has an overall cylindrical cross-sectional shape where the diameter of an inner opening 132 tapers from a larger diameter to a smaller diameter. The materials used to form the die 128 include but are not limited to plastics, aluminum, stainless steel, other metallic materials, composite materials, or other similar materials.

In some embodiments, the die holder 130 has an overall hemispherical outer shape and includes an aperture 140 that is shaped to allow the cross-sectional shape of the tubular member 114 to pass through without applying pressure to the tubular member 114. The shape of the aperture 140 also allows the die holder 130 to rotate relate to the tubular member 114. The die holder 130 also includes a recess 142 that is shaped to receive the die 128. As a result, the die holder 130 provides support for the die 128 without interfering with the operation of the die 128 relative to the tubular member 114. One of ordinary skill in the relevant art will understand that the die holder 130 may have any suitable shape that allows the die 128 to absorb energy by deforming the tubular member 114 as the die 128 slides along the tubular member 114. The materials used to form the die holder 130 include but are not limited to plastics, aluminum, stainless steel, other metallic materials, composite materials, or other similar materials. The die holder 130 is configured to reduce stress between the die 128 and the tubular member 114 by providing stability to the die 128.

In some embodiments, the housing 116 has an inner surface 144 having an overall hemispherical shape that mates with the die holder 130 and an outer cylindrical shape 138 along its main body. The housing 116 also includes an aperture 146 that is shaped to allow the cross-sectional shape of the tubular member 114 to pass through without applying pressure to the tubular member 114. The materials used to form the housing 116 include but are not limited to plastics, aluminum, stainless steel, other metallic materials, composite materials, or other similar materials.

In some embodiments, the housing 116 may also include tabs 148 to mount the housing 116 to the passenger seat 20. In these embodiments, the leg extension 80 may include a recess 150 that is shaped to receive the tabs 148 when the housing 116 is positioned adjacent the leg extension 80. When the tabs 148 are positioned within the recess 150, the energy absorption assembly 18 is held relatively stationary between the passenger seat 20 and the leg extension 80.

The seat mount 118 has an inner surface 134 having an overall cylindrical shape that mates with the outer cylindrical shape 138 of the housing 116. The materials used to form the seat mount 118 include but are not limited to plastics, aluminum, stainless steel, other metallic materials, composite materials, or other similar materials. In some embodiments, the seat mount 118 may also include a flange 152 that is configured to couple to the housing 116 and the passenger seat 20 so that the passenger seat 20 is sandwiched between the seat mount 118 and the housing 116. However, one of ordinary skill in the relevant art will understand that the energy absorption assembly 18 may be coupled to the passenger seat 20 via any suitable coupling mechanism.

Figure 14:
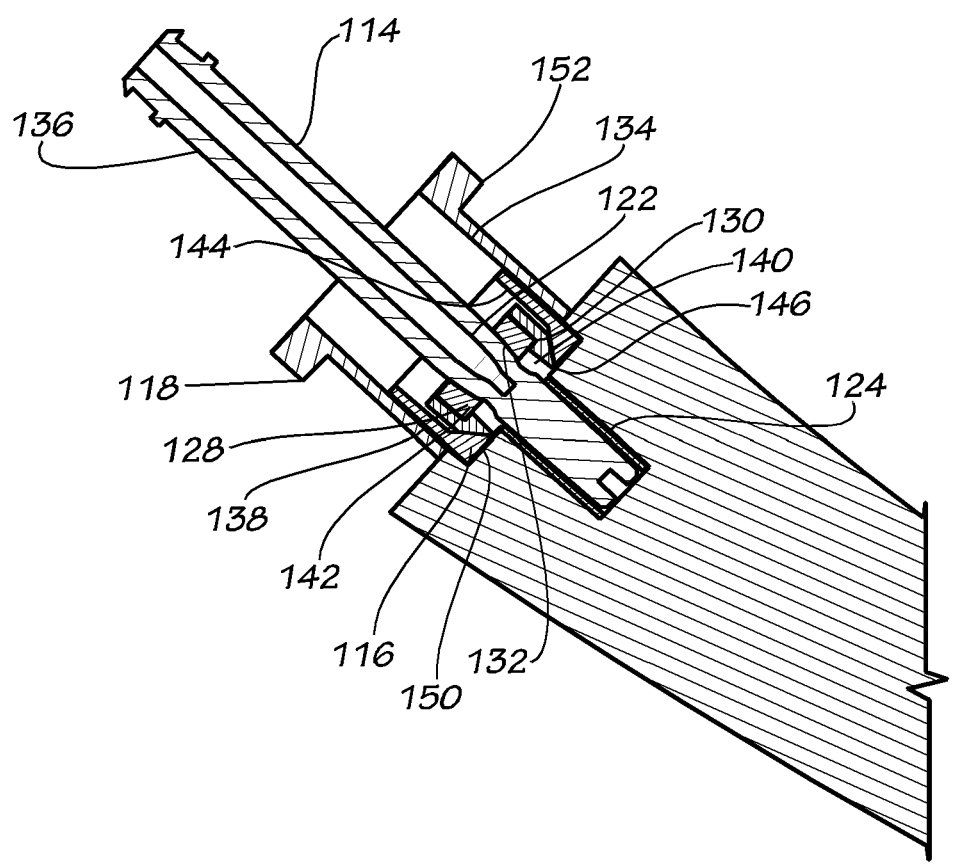
FIG. 14 is a cross-sectional view of an energy absorption assembly according to an alternative embodiment of the present invention
Figure 15:
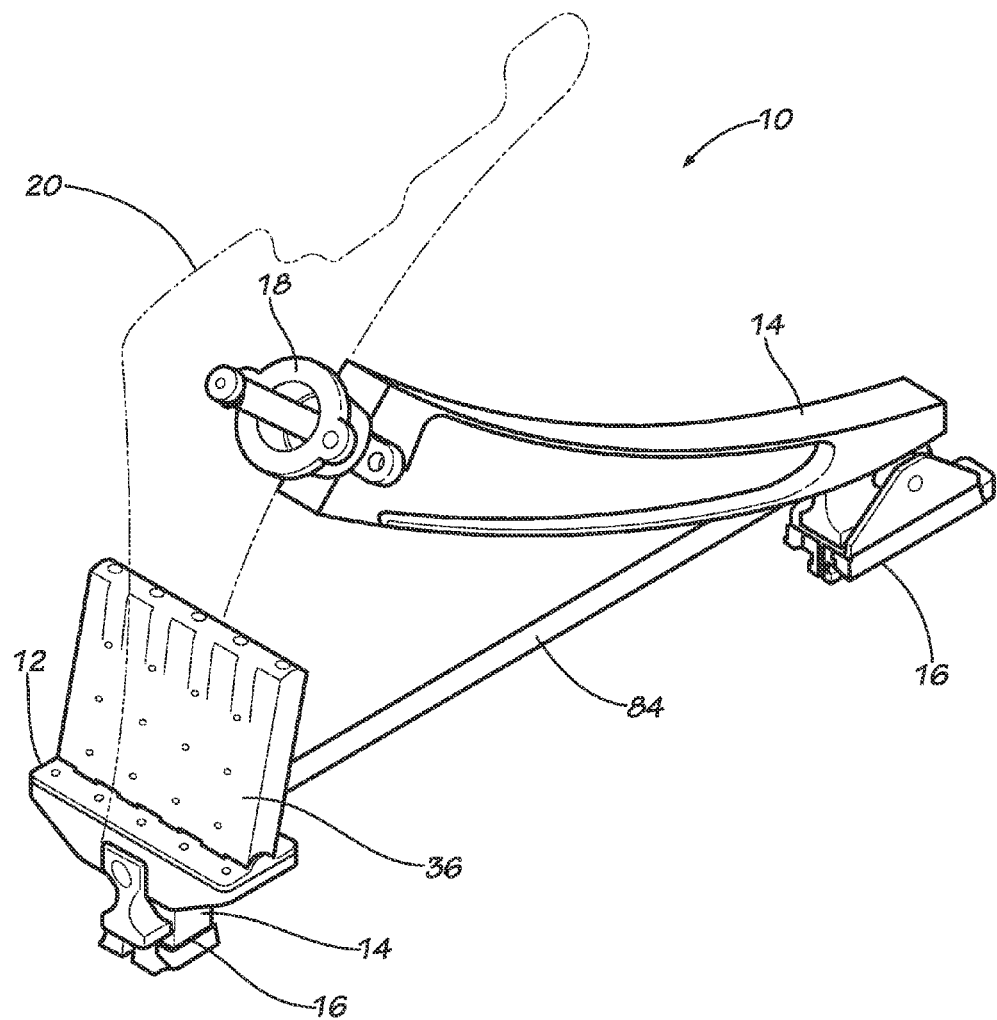
FIG. 15 is a perspective view of the seat support assembly of FIG. 2 with a cover included over the pitch reducer assembly.

In some embodiments, such as the embodiment shown in FIG. 14, the lower end 122 of the tubular member 114 is threaded and the aperture 124 in the leg extension 80 is similarly threaded so that the tubular member 114 is rigidly coupled to the leg extension 80. In these embodiments, the hemispherical shape of the housing 116 and the die holder 130 provide rotational flexibility in the coupling between the leg extension 80 and the passenger seat 20 by allowing the die holder 130 to rotate about an arc of rotation relative to the tubular member 114, while allowing the tubular member 114 to remain aligned with the leg extension 80. Thus, the die holder 130 allows the energy absorption assembly 18 to move in multiple directions to align with the load path without deformation.

Figure 16:
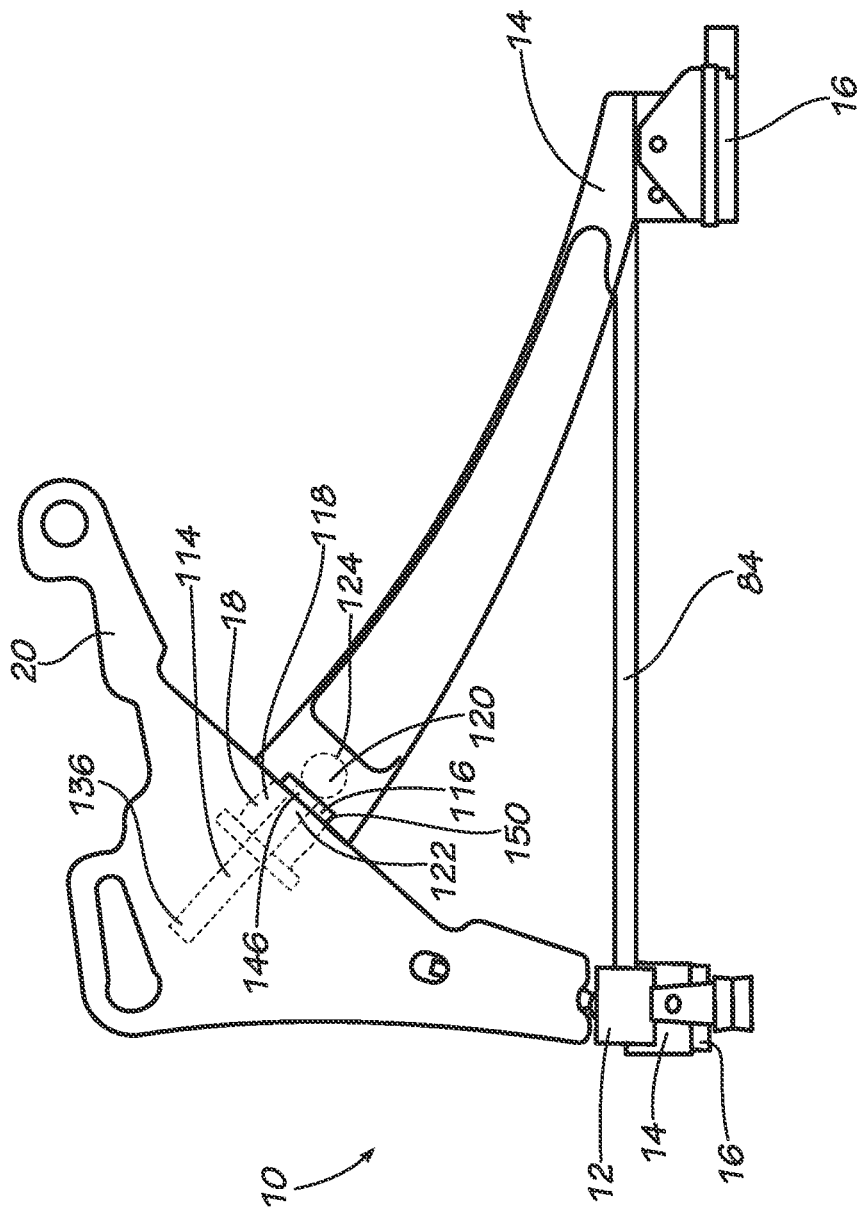
FIG. 16 is a side view of the seat support assembly of FIG. 2 in a retracted pitch position.

In other embodiments, such as the embodiment shown in FIG. 16, the tubular member 114 comprises a ball joint 120 coupled to a lower end 122 of the tubular member 114. The ball joint 120 is positioned within an aperture 124 in the upper end 112 of the leg extension 80. In this embodiment, the ball joint 120 is secured to the leg extension 80 via a nut or other fastening device. In these embodiments, the spherical shape of the ball joint 120 provides rotational flexibility in the coupling between the leg extension 80 and the passenger seat 20 by allowing the tubular member 114 to rotate about an arc of rotation relative to the leg extension 80. Thus, the ball joint 120 allows the energy absorption assembly 18 to move in multiple directions to align with the load path without deformation. The ball joint 120 may be an alternative location to provide rotational flexibility in the coupling between the leg extension 80 and the passenger seat 20 or it may be in addition to the rotational flexibility provided by the housing 116 and the die holder 130.

When a load is applied causing the passenger seat 20 to move forward (or causing the leg extension 80 to move away from the passenger seat 20), the passenger seat 20 causes the die 128 to begin sliding away from the lower end 122 of the tubular member 114 (the stowed position) toward the upper end 136 of the tubular member 114 (the deployed position). Because the tubular member 114 has an undeformed diameter above the die 128 that is greater than the tapered diameter of the inner opening 132 of the die 128, much of the energy is dissipated through the deformation of the tubular member 114 by the movement of the die 128 until the die 128 is either no longer able to slide along the tubular member 114 because the energy has been completely dissipated or the die 128 has reached the upper end 136 of the tubular member 114.

The energy absorption assembly 18 is configured so that the energy absorption assembly 18 remains hidden from view. In some embodiments, the energy absorption assembly 18 is mounted to the passenger seat 20. However, one of ordinary skill in the relevant art will understand that the energy absorption assembly 18 may be used alone or in conjunction with some or all of the other features of the seat support assembly 10.

In use, the seat support assembly 10 allows for rotation and movement in several critical areas to relieve stress due to floor distortion and passenger loading. Specifically, vehicle floor distortion can be separated into pitch and roll.

Figure 17:
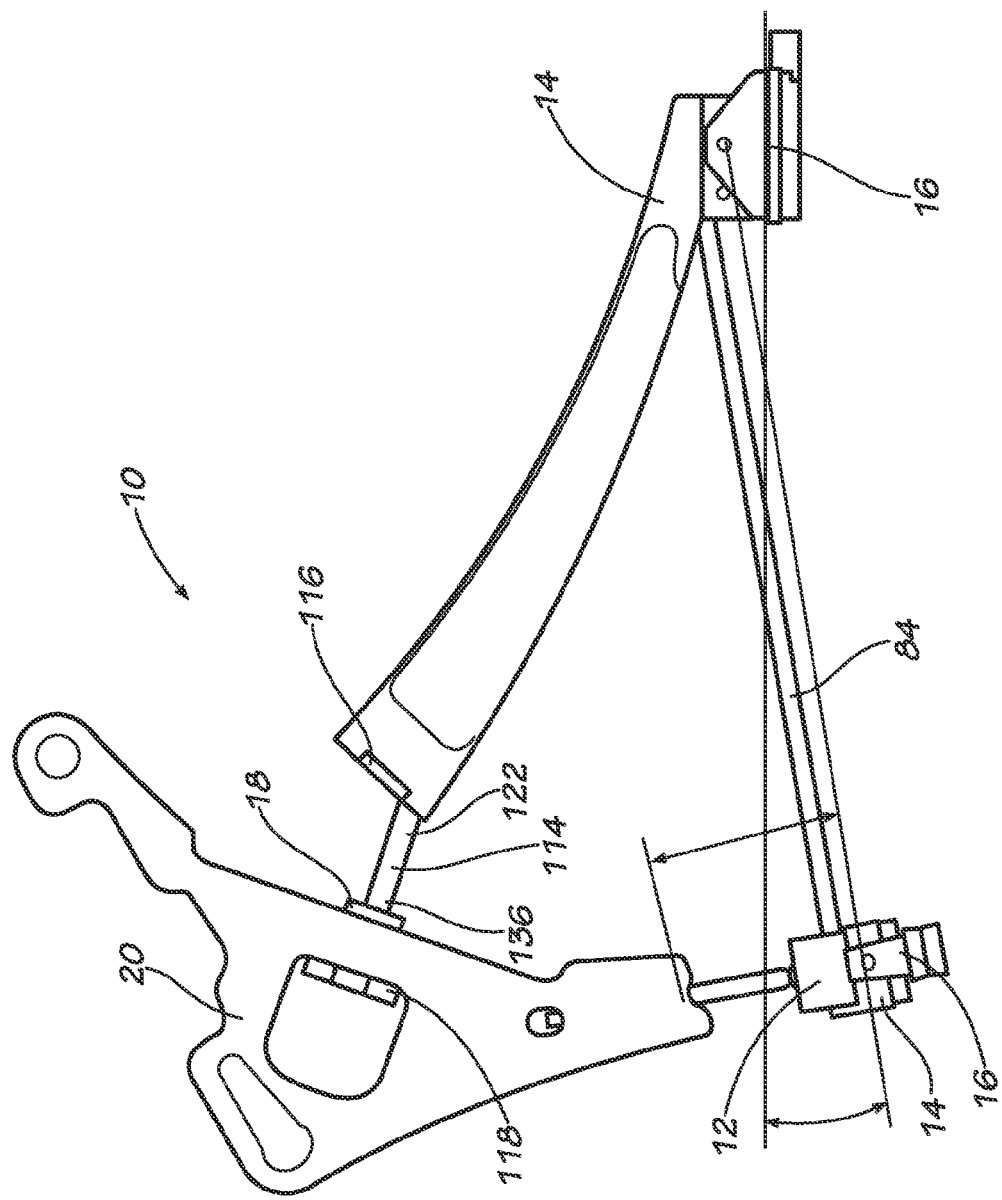
FIG. 17 is a side view of the seat support assembly of FIG. 2 in a deployed pitch position.

With respect to pitch, the pitch reducer assembly 12 is configured to accommodate floor distortion in vertical direction ("pitch"). As shown in FIGS. 16 and 17, the pitch riser 22 and the pitch stop 24 travel up to approximately 2 inches from their retracted positions to their deployed positions, which may accommodate up to approximately a 10 degree pitch change in the vehicle floor. However, one of ordinary skill in the relevant art will understand that any suitable configuration may be used to accommodate other amounts of pitch change.

When the pitch reducer assembly 12 is activated, the riser shaft 28 of the pitch riser 22 is pulled out of the pitch reducer housing 58, which causes the rings 30 to slide off the lower end 50 of the riser shaft 28. As each ring 30 slides off the riser shaft 28, the ring 30 returns to its original shape, thus preventing the riser shaft 28 from returning to it original position. At the same time, the stop shaft 52 of the pitch stop 24 is also being pulled out of the pitch reducer housing 58. When the lower stop 54 of the stop shaft 52 reaches the opening 46 in the pitch reducer housing 58, the stop shaft 52 is stopped from further travel in that direction, which also stops the riser shaft 28 from further travel in that direction.

As the pitch reducer assembly 12 is traveling downward to accommodate for the pitch distortion of the vehicle floor, the forward leg 66 of the integrated leg assembly 14 is also traveling downward and forward relative to the aft leg 68.

The activation of the pitch reducer assembly 12 also activates the energy absorption assembly 18, which causes the seat mount 118 to move forward and slid along the tubular member 114. In the embodiments where the tubular member 114 is rigidly coupled to the leg extension 80, the housing 116 and the die holder 130 provide rotational flexibility so that the passenger seat 20 in its new position remains coupled to the leg extension 80. In the embodiments where the tubular member 114 comprises the ball joint 120, the tubular member 114 and/or the housing 116 and die holder 130 provide rotational flexibility so that the passenger seat 20 in its new position remains coupled to the leg extension 80. In these embodiments, the leg extension 80 may also have some angular flexibility to realign itself with the passenger seat 20.

Thus, as shown in FIGS. 16 and 17, the energy absorption assembly 18 extends up to approximately 2 inches from its original position to coincide with the range of movement of the pitch reducer assembly 12, which may accommodate up to approximately a 10 degree forward and downward shift in the vehicle floor. However, one of ordinary skill in the relevant art will understand that any suitable configuration may be used to accommodate other amounts of pitch change.

Figure 18:
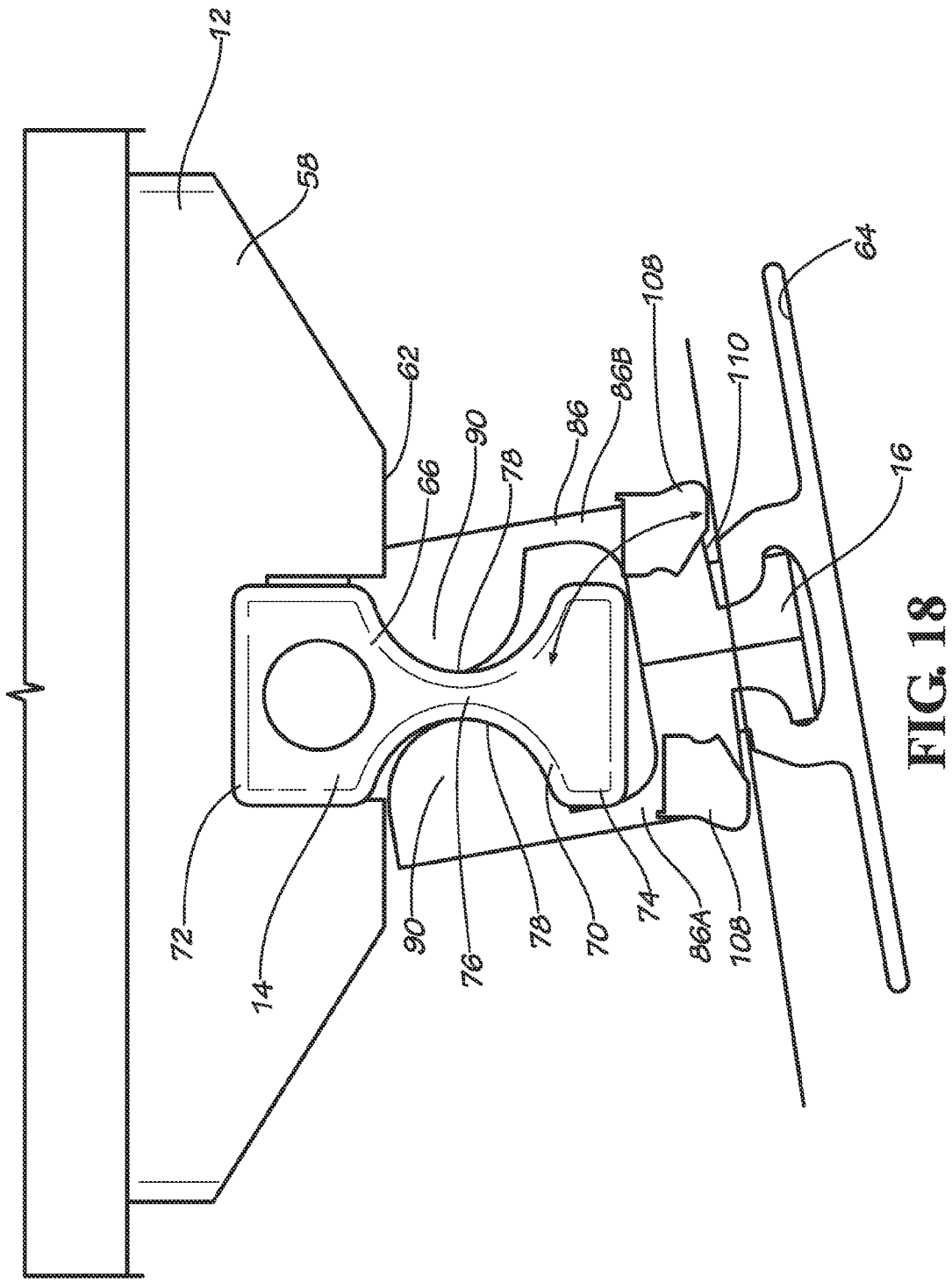
FIG. 18 is a partial front view of the seat support assembly of FIG. 2 in a deployed roll position.

With respect to roll, the coupling configuration between integrated leg assembly 14 and the fitting assembly 16 is designed to accommodate floor distortion in a lateral direction ("roll"). As shown in FIG. 18, the coupling between the integrated leg assembly 14 and the fitting assembly 16 may accommodate up to approximately a 10 degree lateral shift in the vehicle floor. This accommodation is accomplished by the flexibility of the forward housing 86 and the aft housing 88 to rotate relative to the forward leg 66 and the aft leg 68. The split fitting design of the forward housing 86 and the aft housing 88 have additional roll freedom integrated into the housing design because the pair of forward housing mating components 86A and 86B for the forward housing 86 and the pair of aft housing mating components 88A and 88B for the aft housing 88 have the ability to separate from one another in the event the seat track 64 begins to distort. However, one of ordinary skill in the relevant art will understand that any suitable configuration may be used to accommodate other amounts of roll.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat comprising a seat support assembly, wherein the seat support assembly comprises a pitch reducer assembly comprising:
   (a) a pitch reducer housing;
   (b) at least one pitch riser pivotally coupled to the pitch reducer housing, wherein the at least one pitch riser comprises a plurality of rings, each of the plurality of rings comprising a ring aperture, and a riser shaft inserted through the ring aperture of each of the plurality of rings in a retracted position; and
   (b) at least one pitch stop pivotally coupled to the pitch reducer housing,
wherein the passenger seat is coupled to a vehicle floor, and the pitch reducer assembly minimizes a pre-stress load within the passenger seat caused by up to a 10 degree change in vertical pitch of the vehicle floor, by being configured to (i) remove the riser shaft from the ring aperture of at least one ring of the plurality of rings so as to transition the riser shaft from the retracted position to a deployed position, and (ii) position the at least one ring below the riser shaft so as to maintain the riser shaft in the deployed position.

2. The seat support assembly of claim 1, wherein the riser shaft is configured to travel up to approximately 2 inches between the retracted position and the deployed position.

3. The seat support assembly of claim 1, wherein the riser shaft is held in the deployed position by the plurality of rings.

4. The seat support assembly of claim 1, wherein the at least one pitch stop comprises a stop shaft comprising a lower stop.

5. The seat support assembly of claim 1, further comprising a fitting assembly, wherein the fitting assembly comprises:
   (a) a pair of forward housing mating components comprising at least one rotational coupling device; and
   (b) a pair of aft housing mating components comprising at least one rotational coupling device.

6. The seat support assembly of claim 5, wherein the fitting assembly is configured to provide approximately 10 degrees of rotation when coupled to a passenger seat leg.

7. The seat support assembly of claim 5, further comprising an integrated leg assembly, wherein the integrated leg assembly comprises:
   (a) a forward leg comprising at least one rotational coupling receptacle; and
   (b) an aft leg comprising at least one rotational coupling receptacle;
wherein the forward leg is rotationally coupled to the pair of forward housing mating components by inserting the at least one rotational coupling device into the at least one rotational coupling receptacle; and
wherein the aft leg is rotationally coupled to the pair of aft housing mating components by inserting the at least one rotational coupling device into the at least one rotational coupling receptacle.

8. The seat support assembly of claim 7, wherein the forward leg is coupled to the aft leg via a base tube.

9. The seat support assembly of claim 7, wherein the aft leg further comprises a leg extension.

10. A passenger seat comprising a seat support assembly, wherein the seat support assembly comprises an energy absorption assembly comprising:
    (a) a tubular member comprising a ball joint pivotally coupled to a leg extension of the passenger seat;
    (b) a die slidingly coupled to the tubular member; and
    (c) a die holder coupled to the die, wherein the die holder comprises a hemispherical outer surface that is configured to pivotally mate with a hemispherical inner surface of a housing and rotate about an arc of rotation relative to the tubular member,
wherein the ball joint and the hemispherical mating surfaces of the die holder and the housing provide rotational flexibility in the coupling between the passenger seat and the leg extension, thus allowing the energy absorption assembly to move in multiple directions to align with a load path without bending the tubular member.

11. The seat support assembly of claim 10, further comprising an integrated leg assembly, wherein the integrated leg assembly comprises:
    (a) a forward leg; and
    (b) an aft leg comprising the leg extension.

12. The seat support assembly of claim 11, wherein the forward leg is coupled to the aft leg via a base tube.

13. A method of activating a pitch reducer assembly to minimize a pre-stress load within a passenger seat caused by up to a 10 degree change in vertical pitch of a vehicle floor, wherein the a pitch reducer assembly comprises at least one pitch riser and at least one pitch stop, wherein the at least one pitch riser comprises a plurality of rings, each of the plurality of rings comprising a ring aperture, and a riser shaft inserted through the ring aperture of each of the plurality of rings in a retracted position, wherein the passenger seat is coupled to the vehicle floor, the method comprising:
    (a) deploying the riser shaft from the retracted position to a deployed position by removing the riser shaft from the ring aperture of at least one ring of the plurality of rings;
    (b) positioning the at least one ring below the riser shaft so as to maintain the riser shaft in the deployed position; and
    (c) deploying a stop shaft from a retracted position within the at least one pitch stop.

14. The method of claim 13, further comprising removing the riser shaft from the ring aperture of each ring of the plurality of rings.

15. The method of claim 13, further comprising contacting a lower stop of the stop shaft with an opening in a housing surrounding the at least one pitch stop.

16. The method of claim 13, wherein the riser shaft and the stop shaft travel up to approximately 2 inches from the retracted position to the deployed position.

17. The method of claim 13, further comprising rotating the at least one pitch riser and the at least one pitch stop relative to a pitch reducer housing.

18. The method of claim 17, wherein the at least one pitch riser and the at least one pitch stop may rotate up to approximately 10 degrees relative to the pitch reducer housing.

19. A method of activating an energy absorption assembly comprising a tubular member comprising a ball joint coupled to a leg extension of a passenger seat, a die slidingly coupled to the tubular member and located proximate a lower end of the tubular member in a retracted position, a die holder coupled to the die, wherein the die holder comprises a hemispherical outer surface that is configured to pivotally mate with a hemispherical inner surface of a housing and rotate about an arc of rotation relative to the tubular member, the method comprising:

(a) deploying the die from the retracted position to a deployed position by sliding the die along the tubular member; and (b) rotating the tubular member relative to the leg extension to align with a load path without bending the tubular member.

20. The method of claim 19, wherein the die travels up to approximately 2 inches from the retracted position to the deployed position.

21. The method of claim 19, wherein the seat support assembly further comprises a fitting assembly having at least one pair of mating components, the method further comprising:

(c) rotating the at least one pair of mating components; and (d) separating the at least one pair of mating components so that the at least one pair of mating components are not vertically aligned with each other.

22. The method of claim 21, wherein the at least one pair of mating components may rotate up to approximately 10 degrees relative to a passenger seat leg.

* * * * *